(12) United States Patent
Lin

(10) Patent No.: US 7,224,590 B2
(45) Date of Patent: May 29, 2007

(54) FORWARD CONVERTER WITH SYNCHRONOUS RECTIFIER AND REVERSE CURRENT CONTROL

(75) Inventor: Kuo-Fan Lin, Tamsui (TW)

(73) Assignee: AcBol Polytech Inc., Taipei (TW)

( * ) Notice: Subject to any disclaimer, the term of this patent is extended or adjusted under 35 U.S.C. 154(b) by 216 days.

(21) Appl. No.: 10/956,385

(22) Filed: Sep. 30, 2004

(65) Prior Publication Data

US 2006/0072349 A1    Apr. 6, 2006

(51) Int. Cl.
*H02M 3/335* (2006.01)
*H02H 7/122* (2006.01)
*G05F 1/10* (2006.01)

(52) U.S. Cl. .................. 363/21.06; 363/56.01

(58) Field of Classification Search ............. 363/20, 363/21.01, 21.04, 21.06, 21.07, 21.1, 21.14, 363/55, 56.01, 56.09, 56.1
See application file for complete search history.

(56) References Cited

U.S. PATENT DOCUMENTS

| | | | | |
|---|---|---|---|---|
| 5,663,877 A | * | 9/1997 | Dittli et al. ................. | 363/127 |
| 6,256,214 B1 | * | 7/2001 | Farrington et al. ......... | 363/127 |
| 6,414,861 B1 | * | 7/2002 | Matsumoto et al. ........ | 363/56.1 |
| 6,618,274 B2 | * | 9/2003 | Boylan et al. .............. | 363/17 |

* cited by examiner

*Primary Examiner*—Matthew V. Nguyen

(57) ABSTRACT

A control circuit for use in a power converter has a synchronous rectifier for producing substantially direct current, including a sensor for sensing a characteristic of the power converter; detection circuitry capable of using the characteristic to develop a control signal for controlling the power converter; and synchronous rectifier control circuitry connected to the detection circuitry wherein the control circuitry is adapted to modify a duty cycle of the power converter as a function of the control signal thereby to turn off a freewheel switch of the synchronous rectifier before turning off a forward switch of the synchronous rectifier during a reverse current period.

25 Claims, 11 Drawing Sheets

FORWARD CONVERTER WITH SYNCHRONOUS RECTIFIER AND REVERSE CURRENT CONTROL

BACKGROUND OF THE PRESENT INVENTION

1. Field of Invention

The present invention relates to a circuit controller, and more particularly to a forward converter with a synchronous rectifier that is adapted to resolve problems of reverse current.

2. Description of Related Arts

The traditional forward switching power supplies have been widely used currently, because of its high current output capabilities and simplicity. In order to further improve the conducting loss of diodes and overall efficiency, Synchronous Rectifier (SR) approach is the best choice to replace the diode's function. Although the high conducting loss issue can be resolved in the SR technique mostly, there are other problems coming with this SR technology, which is the reverse current issue. It may occur in a number of the different scenarios, such as cutting off during no load, Over Voltage Protection (OVP) testing during an Automatic Test Equipment (ATE) test, or cutting off during a dynamic test. The reverse current issue is attributed to the different characteristics between a diode and a MOSFET. Wherever the SR converter is used, the reverse current must be manipulated carefully, or the reverse current in the circuit may burn down the MOSFET altogether.

Switching power supplies have been widely used currently because of its simplicity, lower output ripple voltage, and high current output capabilities. Conventionally, the key issue is the power efficiency. A conventional forward converter typically utilizes various diodes to transfer the energy from the input to output. However there is high conducting loss by using diodes.

In order to resolve this high conducting loss problem, the lecture has revealed a technique of Synchronous Rectifier (SR) Metal Oxide Semiconductor Field-Effect Transistor (MOSFET) control circuit to replace the traditional diodes. Although the problem of high conducting loss can e resolved mostly, there are other problems coming with this recent technology. There are different characteristics between a diode and a MOSFET. The examples include uni-directional current flow from the anode to the cathode for a diode, as opposed to a bi-directional current from the drain to source or vice versa. In any event, no matter how the converter operates, the diode can block the reverse current from the output of the converter. But it does not happen to the SR MOSFET. Wherever the SR converter is used, the reverse current must be manipulated very carefully, or the reverse current in the circuit may burn down the MOSFET altogether. This reverse circuit may occur in a number of the different scenarios, such as cutting off during no load, Over Voltage Protection (OVP) testing during to Automatic Test Equipment (ATE) test, or cutting off during the dynamic test.

Referring to FIG. 1 of the drawings, a conventional forward converter with SR control circuit is shown. FIGS. 2A to 2C illustrate the key waveforms of the SR circuit under the following conditions: cutting off during no load, OVA test during an ATE test, a cutting off during dynamic test respectively.

Referring to FIG. 2A of the drawings, it is a cut-off time sequence of a normal SR during no load operation. In this operation, since it is a no load operation, the average output current should be zero but the inductor current must be continuous, thus the reverse current is generated. When the circuit works in an on-duty cycle, the reverse current flows through L1, T1, Q2 and G. Therefore, this reverse current is transferred from the secondary side to the primary side and the current path of the primary side is from the primary ground and Q1 to Vin. On the other hand, the positive current flows to charge L1. Subsequently, when the circuit works in an off-duty cycle, the positive current in L1 is discharged to the output. Because the current of L1 must be continuous, the value of the current of L1 is turned into negative to form the reverse current. This reverse energy is charged from C1, L1, Q3 to G. The energy is stored on L1 until the next on-duty cycle.

When the converter cuts off during no load period, the PWM has no drive signal, and Q1 and Q2 are turned off and Q3 is turned on. Because $V_{cc}$ of the SR controller still exists, Q3 keeps on until $V_{cc}$ of the SR controller is diminished to zero. On the other hand, because there is no load in the output, L1 and C1 are resonant until the reverse current disappears on esr of C1 and Rds of Q3. L1 is saturated as short when V0 falls to zero. This reverse current may break down Q3.

Referring to FIG. 2B of the drawings, it is the key waveforms for OVP test during the ATE test. In that situation, an external DC voltage is applied to the output terminal while the converter is kept to work on light loading. Therefore, when the converter is working on the light loading, the average current should be close to zero. If the DC voltage reaches the OVP set point, the converter should be turned off with its internal protection circuit. When the convert starts to test the OVP, the output voltage becomes very high, and for the sake of stability, the duty cycles of the main MOSFET, G1 and the forward MOSFET, G2, become small and the duty cycle of the freewheel MOSFET, G3, becomes large. During this time sequence, L1 is dropped down to produce a large reverse current. The status is similar to the cut-off during no load condition. L1 extracts a lot of current from the external DC source to keep the current stable. Because the external DC source cannot provide so large current for L1 to keep the current stable, it is shut down by its internal over-current protection mechanism. The OVP test item cannot be tested and Q3 also has a chance to be broken by the reverse current.

Referring to FIG. 2C of the drawings, it is the key waveforms with respect to the load transient during dynamic test. When the output load changes from the full loading to light loading, the output voltage changes from low to high. For the reason of the stability, the duty cycle of the main MOSFET, G1, and the forward MOSFET, G2, become small and the duty cycle of the freewheel MOSFET, G3, becomes large. When the output load is in the light loading condition, the average current is zero. The converter is turned off at this particular moment, and it has the similar problem to that of the OVP test, and the reverse current may break down the SR MOSFET.

SUMMARY OF THE PRESENT INVENTION

A main object of the present invention is to provide a forward converter adapting a synchronous rectifier (SR) mechanism, and the problem of reverse current can be substantially relieved for protecting the entire electric circuit.

Another object of the present invention is to provide a forward converter adapting an SR mechanism, and the reverse current during three principal operations, namely, cutting off during no load, OVP test during ATE test, and transient load during dynamic test, can be substantially eliminated.

Another object of the present invention is to provide a forward converter an SR mechanism, and the problem of reverse current during the three principal operations can be substantially resolved, while a response time of the present invention is not substantially affected.

Another object of the present invention is to provide a forward converter adapting an SR mechanism which is reliable and effective in curing the problem of reverse current present in conventional SR electric circuit.

Accordingly, in order to accomplish the above objects, the present invention provides a control circuit adapting a power converter having a synchronous rectifier for producing substantially direct current, comprising:

a sensor for sensing a characteristic of the power converter;

a detection circuitry capable of using the characteristic to develop a control signal for controlling the power converter; and a synchronous rectifier control circuitry connected to the detection circuitry, wherein the control circuitry is adapted to modify a duty cycle of the power converter as a function of the control signal thereby to turn off a freewheel switch of the synchronous rectifier before turning off a forward switch of the synchronous rectifier during a reverse current period.

These and other objectives, features, and advantages of the present invention will become apparent from the following detailed description, the accompanying drawings, and the appended claims.

DETAILED DESCRIPTION OF THE PREFERRED EMBODIMENT

Figure 1:
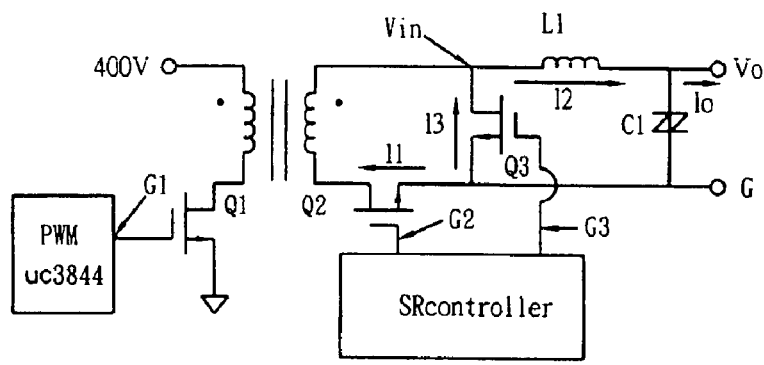
FIG. 1 is a conventional forward converter with SR control circuit.
Figure 2A:
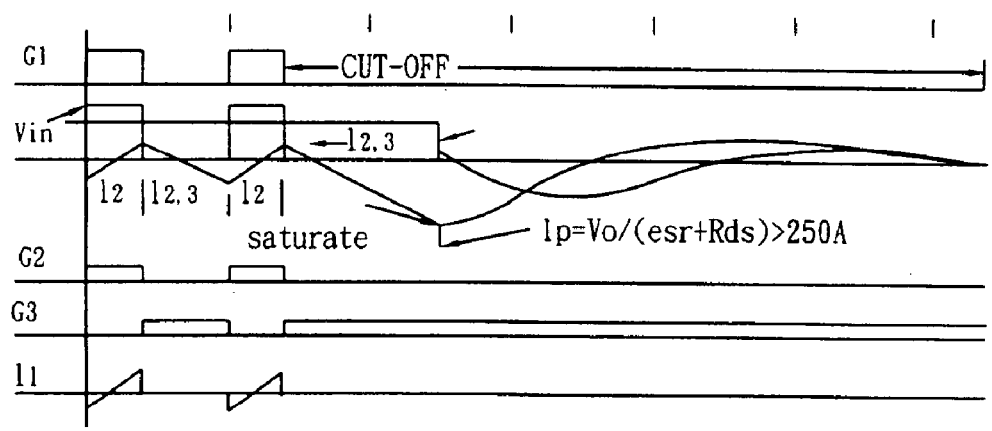
FIGS. 2A to 2C illustrate key waveforms of the conventional forward converter with SR control circuit.
Figure 2B:
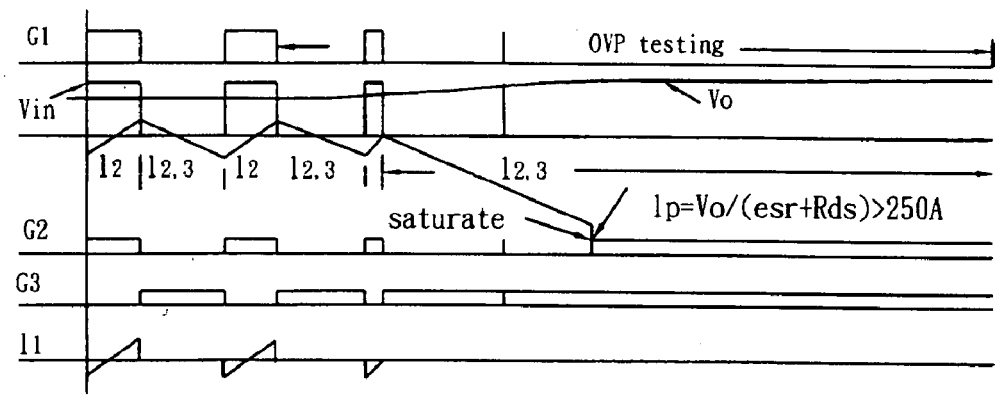
Figure 2C:
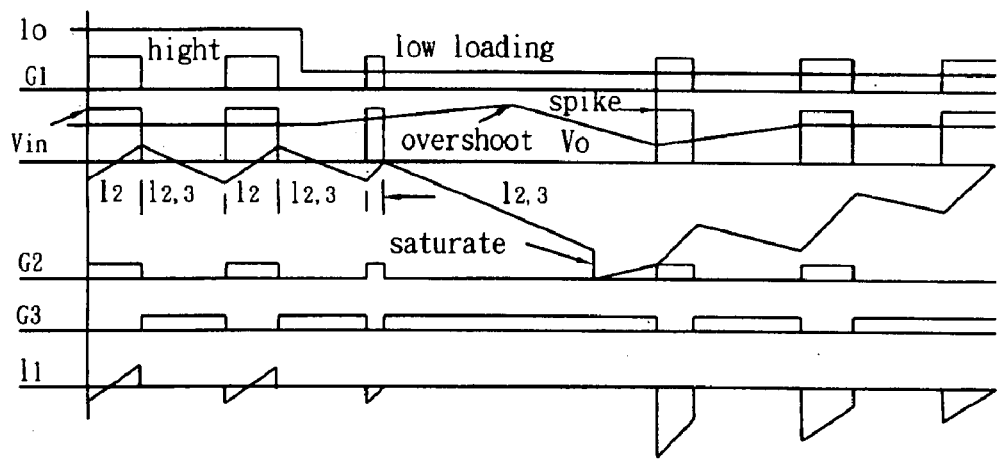
Figure 3:
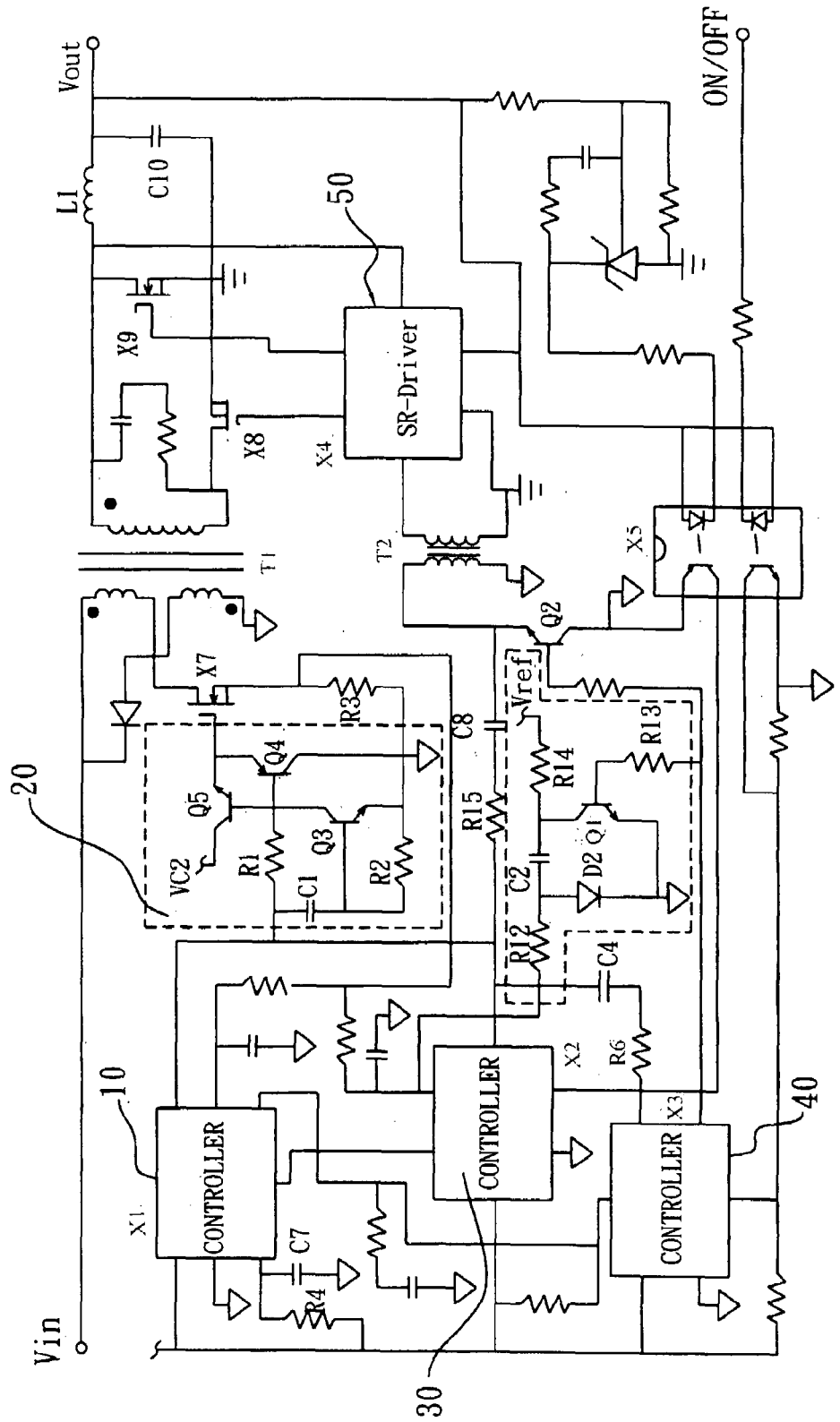
FIG. 3 is a circuit diagram of the forward converter according to the preferred embodiment of the present invention.

Referring to FIG. 3 of the drawings, a circuit diagram of a forward converter using a synchronous rectifier control circuit is illustrated, in which the forward converter comprises a Synchronous Rectifier (SR) control circuit comprising a PWM controller 10, a delay controller 20, a Synchronous Rectifier (SR) continue conduction mode (CCM) controller 30, a SR-on-off controller 40, and a SR driver 50.

The PWM controller 10 is used to generate driver signals for the main MOSFET, X7, and the SR circuit. The delay controller 20 is used to delay the driver signals in order to prevent the overlap between main MOSFET X7 and SR MOSFET, X8, X9. The SR-CCM controller 30 is used to control the reverse current of L1 via extending the duty cycle approach. The SR-on-off controller 40 is used to have the SR control circuit to manage the turning-off sequence. The SR-driver 50 is used to regenerate a clock signal and strengthen the driver capability. Moreover, others circuits basically are necessary to construct a forward convert.

Figure 5:
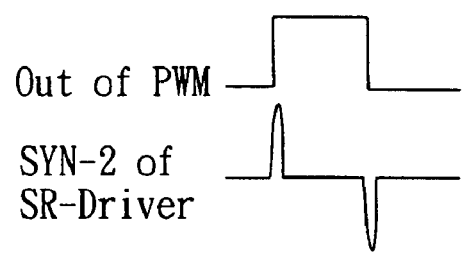
FIG. 5 is a schematic diagram of a relationship between the driver signal and the pulse signal according to the preferred embodiment of the present invention.

As shown in FIG. 3 of the drawings, the SR control circuit further comprises means for converting driver signals into pulse signals, wherein the converting means comprises two pulse generation circuits, one being comprised of a resistor R15 and a capacitor C8, and the other being comprised of a resistor R6 and a capacitor C4, for converting the driver signal into a pulse signal. According to the preferred embodiment, and as shown in FIG. 5 of the drawings, when the drive signal rises from low to high, a positive pulse signal is generated, and subsequently, when the driver signal falls from high to low, a negative pulse signal is then generated. On the other hand, the transformer T2 is used to transfer the pulse signals from a primary side to a secondary side.

On the other hand, Q2 is used to erase the negative pulse of the driver signal when the HOLD signal of the SR-on-off controller 40 is high. R12, D2, C2, Q1, R14 and R13 are used to force the current sense signal to be negative when HOLD is high. When the converter works in the normal condition, HOLD is low and Q1 is off, and the anode of D2 is bypassed at 0.7V. Therefore it has no influence for CRS. When the converter works in shut down condition, HOLD is high and Q1 is ON. Because the voltage of C2 cannot change at instant, the anode of D2 is bypassed at −0.7V. Therefore, CRS is forced to be negative for one cycle, and ON/OFF is a control signal. ON/OFF is low when the converter is on, and is high when the converter starts to turn.

Figure 4:
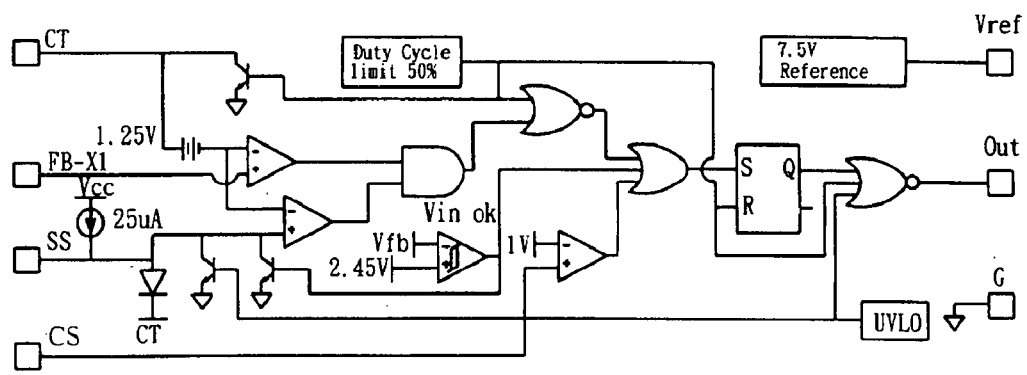
FIG. 4 is a circuit diagram of the PWM controller according to the above preferred embodiment of the present invention.

Referring to FIG. 3 and FIG. 4 of the drawings, the PMW controller 10 is preferably embodied as a ML4800 PMW IC, wherein CT terminal is a sawtooth wave generator and having a duty frequency determined by R4 and C7. FB-X1 terminal of the PMW controller 10 (X1) is used for communicating the feedback signal that comes from a FBO terminal of the SR-CCM CTL 30 so as to decide the "out" duty cycle. Because there is a duty cycle limit, the PMW only has a maximum of 50% duty cycle. SS terminal is used for communicating a soft start that comes from SR-on-off controller 40. CS terminal is used for communicating with the main MOSFET current signal that comes from R3. Because there is a comparator inside and its maximum degree is 1V, the maximum transferring degree of CS is 1V. $V_{ref}$ terminal is a reference voltage terminal and it has a constant voltage of 7.5V. "Out" terminal is used for delivering the main driver signal that is used to control the main MOSFET, X7, forward MOSFET, X8, and freewheel MOSFET, X9.

The delay controller 20 comprises means for delaying pulse signals which are to be fed to X7 in a predetermined period of time. According to the preferred embodiment, the delaying means comprises a delay circuit comprising resistor R1, resistor R2, capacitor C1 and transistor Q3 which are electrically connected for delaying the driver signal, as converted into the pulse signal by the converting means, which is to be fed to X7.

Q4 and Q5 are combined to be a totem pole. The purpose of this circuit is to make X7 to have a pulse later than SR, which can turn X8 on and turn X9 off before X7 is turned on. When PMW signal comes, C1 is charged and Q3 is turned on, so the pulse still does not pass to X7. Q3 is turned off until C1 is saturated, and therefore the pulse starts to pass to X7, and there is a 200 ns delay time.

Figure 6:
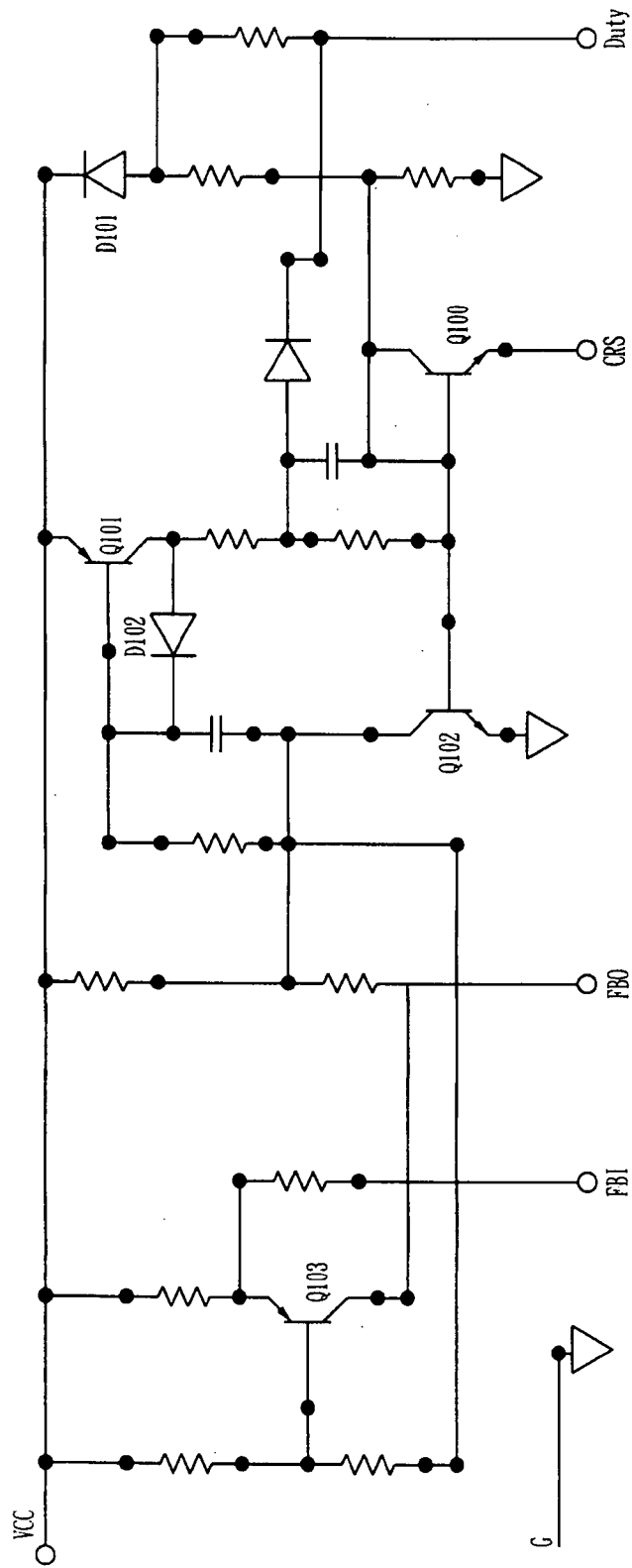
FIG. 6 is a circuit diagram of the SR-CCM controller according to the above preferred embodiment of the present invention.

Referring to FIG. 6 of the drawings, a circuit diagram of the SR-CCM controller 30 according to the preferred embodiment of the present invention is illustrated. The SR-CCM controller 30 comprises means for turning a duty cycle to a predetermined period of time in such a manner that X7 would have an enough time for being charged.

The cycle turning means comprises a SR-CCM controller circuit having six electric terminals, namely a FBI terminal, a G terminal, a Duty terminal, a CRS terminal, a FBO terminal, and a VCC terminal. According to the preferred embodiment, the VCC terminal and the G terminal are connected to power sources. FBI is used for receiving feedback signal that comes from the output voltage. FBO is used for receiving feedback signal that is generated by FB-X1 terminal of the PWN controller 10. CRS terminal is used for communicating with the main MOSFET current sense signal which comes from the current sense register, R3. "Duty" terminal is used for communicating with the pulse signal that comes from "Out" terminal of the PWM controller 10.

Referring to FIG. 3 and FIG. 6 of the drawings, the resistor R3 is used to detect the current waveform when X7 is under ON condition. This polarity of the current waveform is followed with the output current (IL1). Therefore, the CRS terminal is used to detect the output current and makes command for the FBO terminal. When this current works at normal condition, FBO terminal follows the FB signal. When this circuit works at error condition, FBO is pulled to high. The waveform of the anode of D101 is the same as that of the "Duty" terminal.

When the forward converter works at a normal condition, the signal at the CRS terminal is positive. When "Duty" terminal is ON, Q100 is OFF. The anode of D101 is ON; Q102 is ON, Q101 is therefore ON through VCC terminal 05, Q102 and G terminal. Moreover, the collector of Q102 is at low condition; Q103 is a current source when the collector of Q102 is low, and the FBO follows the FBI signal.

When "Duty" terminal is OFF, Q100 is OFF. The anode of D102 is OFF, Q102 is OFF, Q101 is OFF, collector of Q102 is at high condition, Q103 is OFF, and FBO equals VCC in this scenario.

On the other hand, when the forward converter is turned off at reversed current condition, the polarity of the signal at CRS follows the output current. When "Duty" is ON and CRS is negative, Q100 is ON. The anode of D101 is pulled to low; Q102 is OFF; 101 are OFF; the collector of Q102 is at high condition; Q103 is OFF, and the output in FBO equals to that of VCC in this scenario. When signal at CRS goes back to zero, FBO follows FB again. When CRS becomes positive, the SR-CCM controller is back to the normal condition. When "Duty" is OFF, the result is the same as that of the normal condition.

Figure 7:
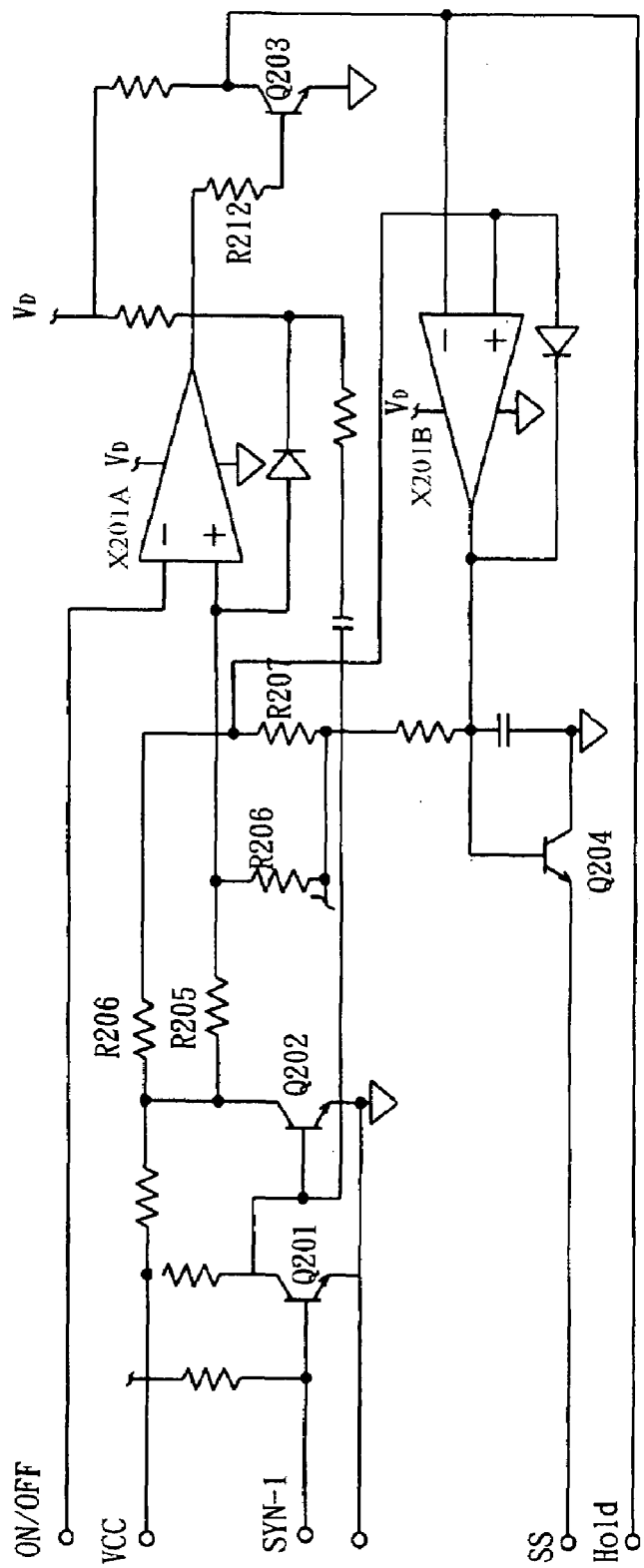
FIG. 7 is a circuit diagram of the SR-on-off controller according to the above preferred embodiment of the present invention.

Referring to FIG. 7 of the drawings, a circuit diagram of the SR-on-off controller 40 is illustrated. The SR-on-off controller 40 comprises means for regulating a sequence of turning on an off of the SR control circuit (i.e the duty cycle). In turn, the sequence regulating means comprises a SR-on-off controller circuit as shown in FIG. 7. The SR-on-off controller circuit (X3) had six terminals, namely, VCC terminal, G terminal, ON/OFF X-3 terminal, SYN-1 terminal, SS terminal, and a HOLD terminal. VCC and G are arranged to connect with power sources. ON/OFF X-3 terminal is used for sending signal so as to control when the SR control circuit needs to be on or off. SYN-1 terminal is used for communicating with the pulse signal that is connected to "OUT" terminal of the PMW controller 10. SS terminal is used for communicating with the soft start signal that is connected to SS terminal of the PMW controller 10, wherein the soft start signal is used to turn off the forward MOSFET, X8. HOLD terminal is used to send signal for turning off the freewheel MOSFET, X9.

The operation of the SR-on-off controller 40 is elaborated as follows: in normal situation, when SYN-1 is ON and ON/OFF is low, the down side of X5 is ON. ON/OFF X3 is low, Q201 is OFF, Q202 is ON; the positive input terminal of X201A equals to $$VCCx\frac{R205}{R205+R206};$$

the positive input terminal of X201A equals to $$VCCx\frac{R204}{R204+R207};$$

the output X201A is high; Q203 is ON, R212 and Q203 are used to delay the output signal of X201A; the negative input terminal of X201B is low; HOLD is low, the output of X201B is high; Q204 is OFF, and SS is high. As a result, the PMW controller 10 keeps on working.

When the signal in SYN-1 is in OFF condition, and ON/OFF is low, the down side of X5 is ON. ON/OFF X3 is low, Q201 is ON, Q202 is OFF, the signal of positive input terminal of X201A equals to that of VCC, the output of X201A is high, Q203 is ON, the negative terminal of X201B is low, HOLD is low, the output of X201B is high; Q204 is OFF, and SS is high. Therefore, the PMW controller 10 keeps on working.

On the other hand, when the forward converter is turned off at reverse current condition, when SYN-1 is low and ON/OFF is high, the down side of X5 is OFF, ON/OFF-X3 is high; Q201 is OFF, Q202 is ON, the positive input terminal of X201A equals to $$VCCx\frac{R202}{R205+R206};$$

the positive input terminal of X201B equals to $$VCCx\frac{R204}{R204+R207};$$

the output of X201A is low; D201 is conducted; the positive input terminal of X201A is latched at 0.7V; Q203 is OFF; the negative input terminal of X201B is high; D202 is conducted; the positive input terminal of X201B is latched at 0.7V; HOLD is high; the output of X201B is low; Q204 is ON, and SS is low. Therefore the freewheel MOSFET is forced to turn off before the PMW controller 10 stops working.

When SYN-1 is high and ON/OFF is high, the down side of X5 is OFF, ON/OFF-X3 is high; Q201 is ON, Q202 is OFF, the positive input terminal of X201A is 0.7V; the positive input terminal of X201B is 0.7V; the output of X201A is low, Q203 is OFF; the negative input terminal of X201B is HIGH; HOLD is high, the output of X201B is low; Q204 is ON, and SS is low. As result, PMW controller 10 stops working.

Figure 8:
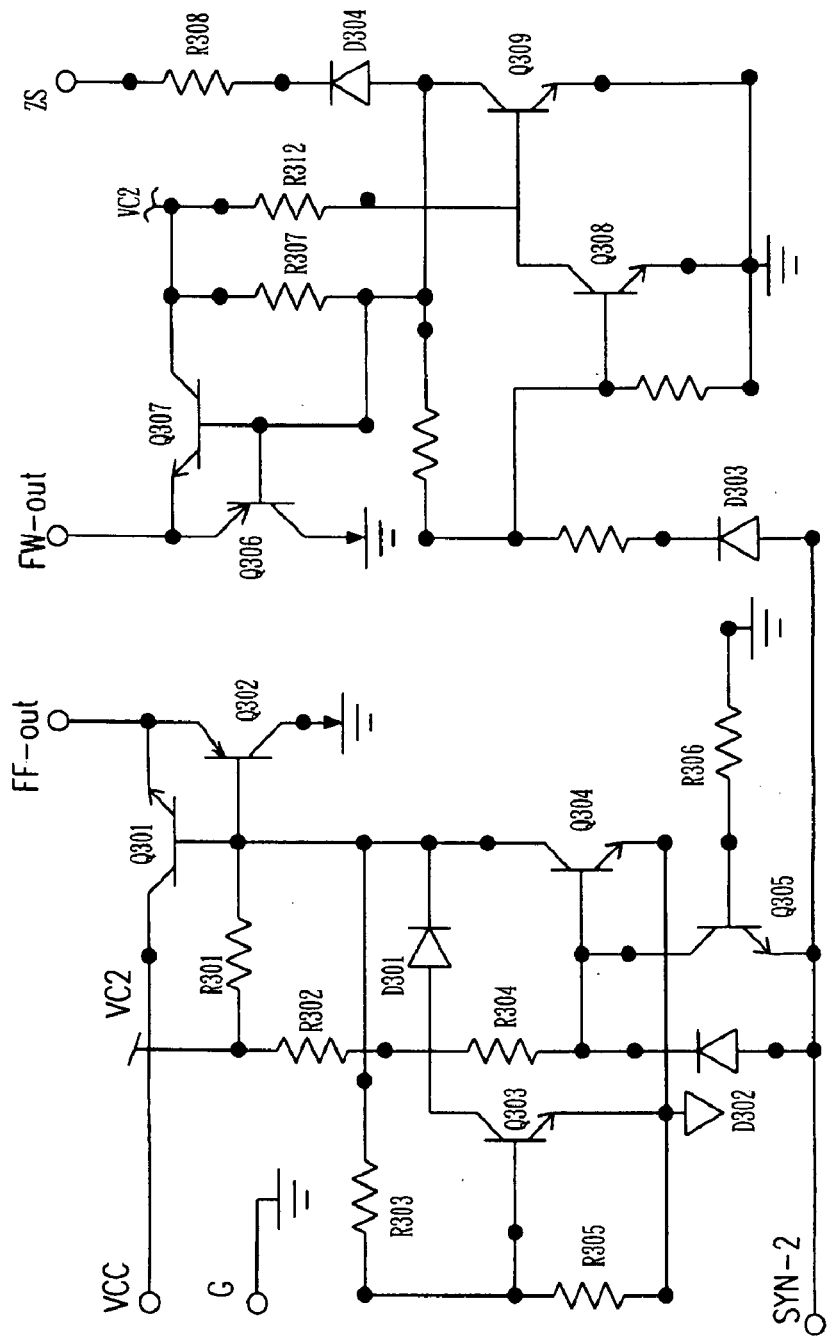
FIG. 8 is a circuit diagram of the SR driver according to the above preferred embodiment of the present invention.

Referring to FIG. 8 of the drawings, a circuit diagram of the SR driver 50 according to the preferred embodiment is illustrated. The SR driver 50 comprises means for strengthening the driver signal, this strengthening means comprises a SR driver circuit as shown in FIG. 8 of the drawings. The SR driver circuit has six terminals, namely a SYN-2 terminal, G terminal, VCC terminal, ZS terminal, FF-out terminal, and FW-out terminal. VCC and G terminals are arranged to connect with power sources. SYN-2 terminal is adapted to communicate with the forward and freewheel MOSFET drive signal that comes from the PMW controller 10 though T2 so as to attend the synchronous rectifier function. FW-out is used to communicate with the driver signal MOSFET X8. FF-out is used for communicating with the driver signal of the freewheel MOSFET X9. ZS is used to generate signal for detecting the drain voltage of the freewheel MOSFET X9 and to determine when X8 is ON or OFF.

When SYN-2 is positive, D302 is ON, Q304 is ON, Q301 and Q302 are pulled OFF, D301 is ON through VC2, R302, D301, Q304 to G, and the anode voltage of D301 keeps at around 0.6V to let Q304 remains ON. As a result, FF-out is OFF at this time sequence.

At the same time, D303 is ON; Q308 is ON, Q309 is OFF as open; collector of Q309 is pulled to high through VC2, R307 to collector; Q307 and Q306 are pulled to high, and the collector is used to let Q308 remains ON at this time sequence. As a result, FW-out is ON at this time sequence.

ZS is used to detect the drain voltage of X9. When SYN-2 is positive, ZS is high. When SYN-2 is negative, ZS is low. If ZS is high, ZS has no influence to the collector of Q309. If ZS is low, the collector of Q309 is pulled to low.

When SYN-2 is negative, D302 is OFF; D305 is ON; Q304 is OFF, Q301 and Q302 are pulled high though VC2, R301 to the collector of Q304; D301 is OFF, Q303 is ON through VC2, R301, R303 and R305, and the anode voltage of D301 is low to let Q304 remains OFF. Therefore, FF-out is ON at this time sequence.

At the same time, D303 is OFF, ZS drops to zero, the collector of Q3098 is pulled to low through VC2, R307, D304, R308 to ZS; Q308 is OFF, Q309 is ON, from VC2 and R312 to the base of Q309, and Q307 and Q306 are pulled to low. Therefore, FW-out is OFF at this time sequence.

Figure 9:
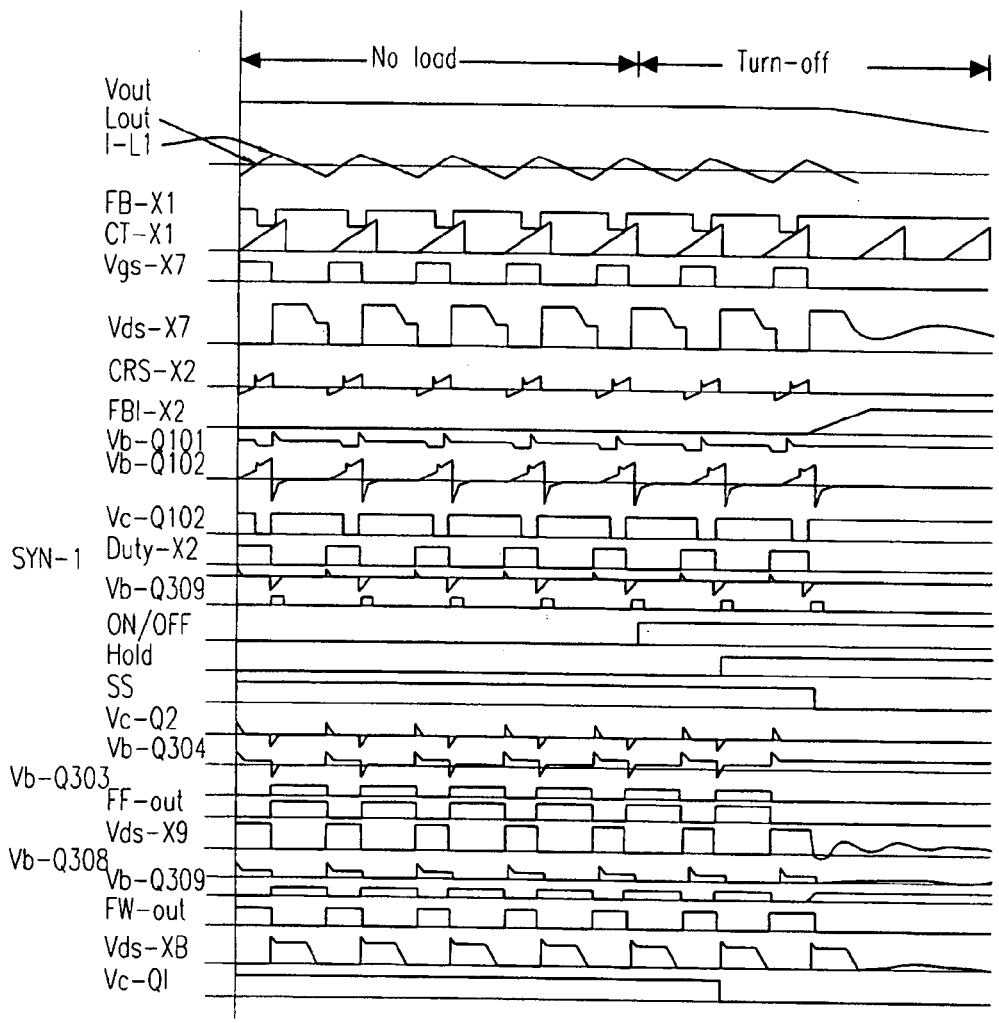
FIG. 9 is the key waveforms of the forward converter according to the above preferred embodiment of the present invention, illustrating that the forward converter is subject to cut off during no load condition.

Referring to FIG. 9 accompanying FIG. 3 of the drawings, it illustrates the key waveforms of the forward converter according to the preferred embodiment of the present invention, wherein the forward converter is subject to cut off during no load condition. I-L1 has both positive and negative currents. However, since the present condition is set to no load condition, as long as the average current is zero, there would be no problem. When the converters starts to turn off, ON/OFF is pulled to high so that HOLD would also be pulled to HIGH in the next cycle. At this time CRS of X2 (SR-CCM controller 30) is forced to be negative and X8 is turned on and X9 is turned off. X9 is thus pre-cut off by HOLD and the reverse current is dissipated form the secondary side to the primary side. In the next cycle, SS is pulled to low to turn off X8. Because X9 is turned off in the previous time sequence, and X8 is turned off in this time sequence and the reverse current has no path to flow, therefore, one skilled in the art would have appreciate that the reverse current will not cause damage to X8 and X9.

Figure 10:
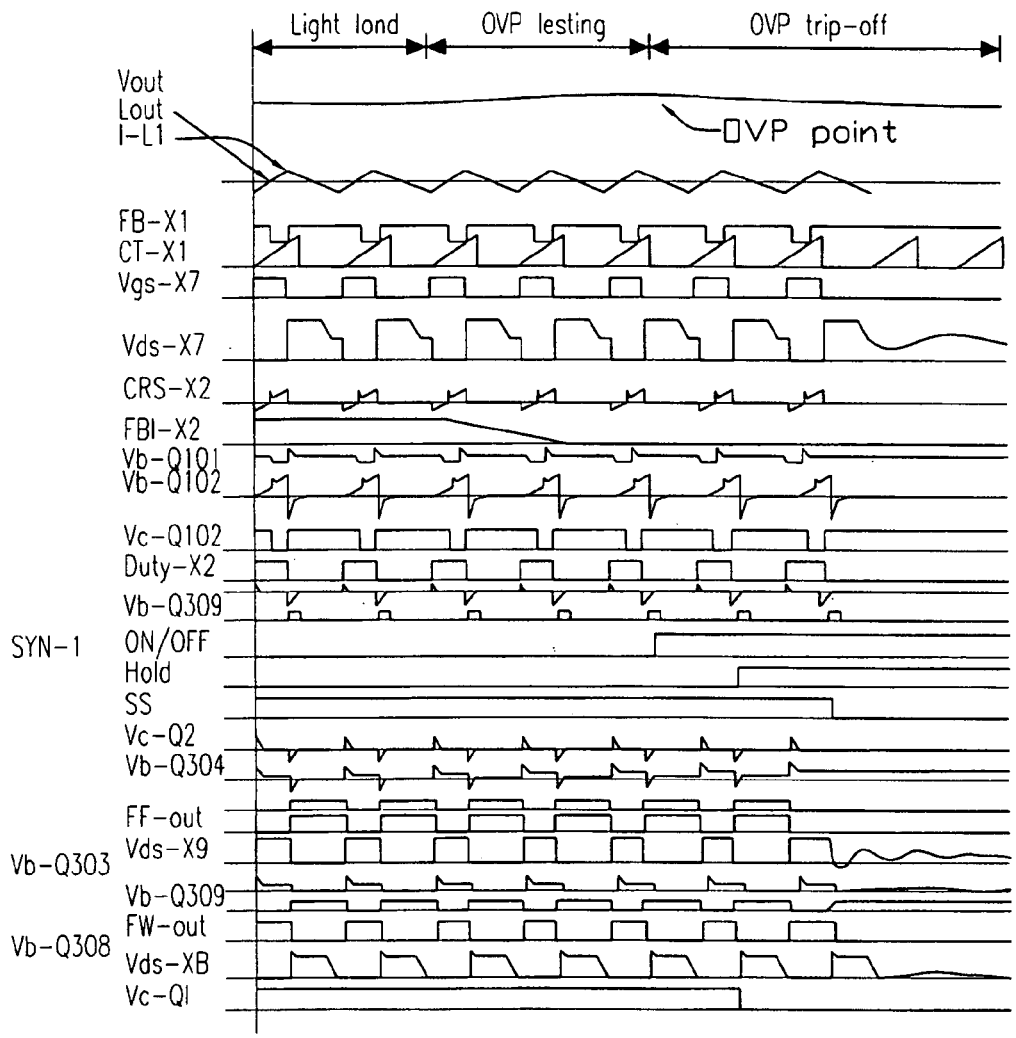
FIG. 10 is the key waveforms of the forward converter according to the above preferred embodiment of the present invention, illustrating that the forward converter is subject to OVP test during ATE test condition.

Referring to FIG. 10 of the drawings, it illustrates the key waveforms of the forward converter according to the preferred embodiment of the present invention, wherein the forward converter is subject to OVA test during ATE test. At the time the forward converter starts to run the OVP test, Vout is increasing until the set point is reached, as a result, FBI-X2 will be decreasing. When FBI-X2 reaches zero, the duty cycle is kept constant, and thus Vgs-X7 is kept constant to let I-L1 to be kept negative until the forward converter is completely turned off. When Vout reaches the OVP set point, the forward starts to turn off. ON/OFF is pulled to high to have HOLD to be pulled to high in next cycle. At this time, CRS of X2 is forced to be negative; X8 is turned on and X9 is turned off, and thus X-9 is pre-cut off by HOLD and the reverse current is dissipated from the secondary side to the primary side. In the subsequent cycle, SS is pulled to low to turn off X8. Because X9 is turned off in the previous time sequence and X8 is turned off in this time sequence, the reverse current would not break X8 and X9.

Figure 11:
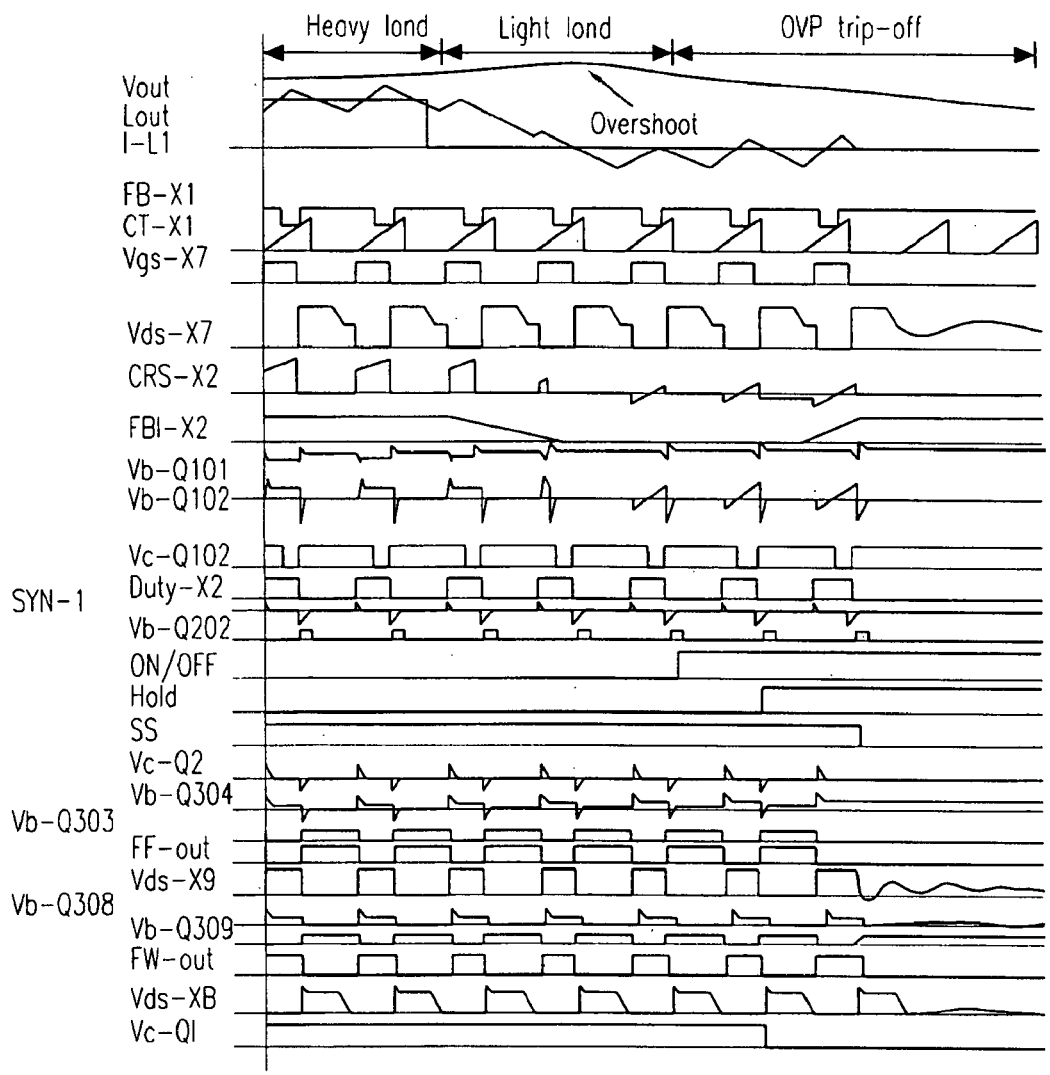
FIG. 11 is the key waveforms of the forward converter according to the above preferred embodiment of the present invention, illustrating that the forward converter is subject to load transient during dynamic test.

Referring to FIG. 11 of the drawings, it illustrates the key waveforms of the forward converter of the present invention when it is subject to transient load during dynamic test. According to the preferred embodiment, the transient load is from heavy loading to light loading. In this process, Vout will be becoming high. Referring to FIG. 11 of the drawings, one may appreciate is similar to those of the OVP test during ATE test shown in FIG. 10, nevertheless, reverse current problem is substantially relieved.

Figure 12:
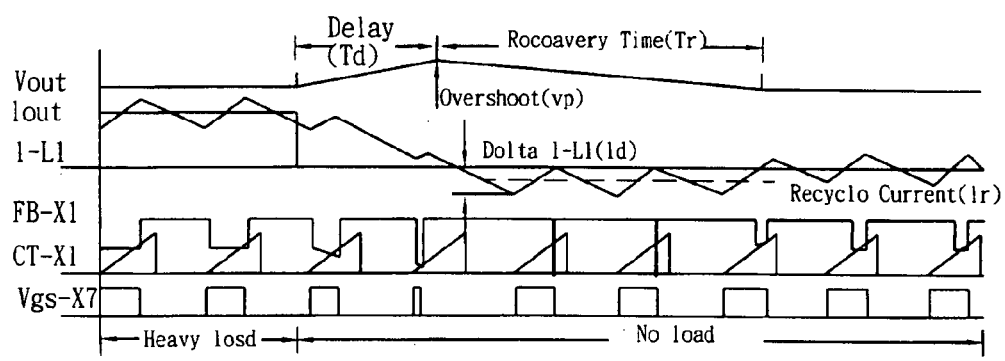
FIG. 12 is response time waveforms of the forward converter according to the preferred embodiment of the present invention.

Referring FIG. 12 of the drawings, the response time waveforms of the forward converter of the present invention is illustrated. According to the present invention, the total response time $T_{tr}=T_d+T_r$, where $T_d$ is the set up time, and $T_r$ is the recovery time of the control circuit.

On the other hand, $V_p=V_{out}+\Delta V$, where $$\Delta V = \frac{I_{out}T_d}{2C_o}$$

As a result, $$V_p = V_{out} + \frac{I_{out} T_d}{2 C_o},$$

where $C_o$ is the output capacitance, and $V_P$ is defined as the overshoot voltage.

According to the Voltage-Second balance theory, the energy on the output choke L1 may be expressed as $(V_{in} - V_{out})DT = V_{out}(1-D)T$ where D is $$\frac{V_{out}}{V_{in}},$$

and the above equation may be defined by parameter Y, where $$Y \equiv \frac{V_{out}(1 - V_{out})}{V_{in}} T$$

The recovery time $T_r$ is the time interval of changing from $V_p$ to $V_{out}$. $Y_{av}$ is the average integral of $V_{out}$ and can be expressed as:

$$Y_{av} = \frac{\int_{V_{out}}^{V_p} Y \, dV_{out}}{V_p - V_{out}}$$
$$= T\left(\frac{V_p + V_{out}}{2} - \frac{V_p^2 + V_p V_{out} + V_{out}^2}{3 V_{in}}\right)$$

Wherein $$I_d = \frac{Y_{av}}{L_l} \text{ and } I_r = \frac{I_d}{2} = \frac{Y_{av}}{2 L_l} \text{ and } T_r = \frac{1}{I_r} C_o(V_P - V_{OUT})$$

Where $I_d$ is the delta current of L1; $I_r$ is the average recycle current of L1, and $T_r$ is the recovery time of the control circuit.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A control circuit for use in a power converter having a synchronous rectifier for producing substantially direct current, comprising:
    a sensor for sensing a characteristic of said power converter;
    a detection circuitry capable of using said characteristic to develop a control signal for controlling said power converter; and
    a synchronous rectifier control circuitry connected to said detection circuitry wherein said control circuitry is adapted to modify a duty cycle of said power converter as a function of said control signal so as to turn off a freewheel switch of said synchronous rectifier before turning off a forward switch of said synchronous rectifier during a reverse current period.

2. The control circuit, as recited in claim 1, wherein said synchronous rectifier control circuitry comprises:
    a PWM controller for generating driver signals for driving a main switch of said power converter and said synchronous rectifier;
    a SR-on-off controller, electrically connected with said PWM controller, for managing a turning-off sequence of said duty cycle; and
    a SR driver, electrically connected with said PWM controller and said SR-on-off controller, for driving said freewheel switch and said forward switch.

3. The control circuit, as recited in claim 2, wherein said synchronous rectifier control circuitry further comprises a delay controller for delaying pulse signals which are to be fed to said main switch for a predetermined period of time.

4. The control circuit, as recited in claim 2, wherein said synchronous rectifier control circuitry further comprises a duty cycle turning circuit for turning a duty cycle to a predetermined period of time in such a manner that said main switch is adequately charged.

5. The control circuit, as recited in claim 3, wherein said synchronous rectifier control circuitry further comprises a duty cycle turning circuit for turning a duty cycle to a predetermined period of time in such a manner that said main switch is adequately charged.

6. The control circuit, as recited in claim 2, wherein said PMW controller is ML4800 PMW IC, having a CT terminal for generating sawtooth wave of a predetermined duty frequency, a FB-X1 terminal communicating with said synchronous rectifier continue conduction mode controller, first SS terminal for communicating with said SR-on-off controller, a CS terminal for communicating with a current signal from said main switch, a $V_{ref}$ terminal for maintaining a reference voltage, and a "Out" terminal for delivering signals to said main switch, said forward switch, and said freewheel switch.

7. The control circuit, as recited in claim 5, wherein said PMW controller is ML4800 PMW IC, having a CT terminal for generating sawtooth wave of a predetermined duty frequency, a FB-X1 terminal communicating with said synchronous rectifier continue conduction mode controller, first SS terminal for communicating with said SR-on-off controller, a CS terminal for communicating with a current signal from said main switch, a $V_{ref}$ terminal for maintaining a reference voltage, and a "Out" terminal for delivering signals to said main switch, said forward switch, and said freewheel switch.

8. The control circuit, as recited in claim 4, wherein said SR-on-off controller comprises a regulating circuit for regulating a sequence of turning on and off said duty cycle.

9. The control circuit, as recited in claim 7, wherein said SR-on-off controller comprises a regulating circuit for regulating a sequence of turning on and off said duty cycle.

10. The control circuit, as recited in claim 4, wherein said SR driver comprises a strengthening circuit for strengthening said driver signal.

11. The control circuit, as recited in claim 9, wherein said SR driver comprises a strengthening circuit for strengthening said driver signal.

12. The control circuit, as recited in claim 4, further comprising a converting circuit for converting said driver signals into pulse signals.

13. The control circuit, as recited in claim 11, further comprising a converting circuit for converting said driver signals into pulse signals.

14. The control circuit, as recited in claim 2, wherein said reverse current period is selected from the group of consisting of cutting off during no load operation, OVP test during ATE test operation, and transient load during dynamic test operation.

15. The control circuit, as recited in claim 13, wherein said reverse current period is selected from the group of consisting of cutting off during no load operation, OVP test during ATE test operation, and transient load during dynamic test operation.

16. A power converter, comprising:
a synchronous rectifier adapted to rectify substantially alternating current to produce substantially direct current; and
a control circuit, which comprises:
a sensor for sensing a characteristic of said power converter;
a detection circuitry capable of using said characteristic to develop a control signal for controlling said power converter; and
a synchronous rectifier control circuitry connected to said detection circuitry wherein said control circuitry is adapted to modify a duty cycle of said power converter as a function of said control signal thereby to turn off a freewheel switch of said synchronous rectifier before turning off a forward switch of said synchronous rectifier during a reverse current period.

17. The power converter, as recited in claim 16, wherein said synchronous rectifier control circuitry comprises:
a PWM controller for generating driver signals for driving a main switch of said power converter and said synchronous rectifier;
a SR-on-off controller, electrically connected with said PWM controller, capable of managing a turning-off sequence of said duty cycle; and
a SR driver, electrically connected with said PWM controller and said SR-on-off controller, capable of driving said freewheel switch and said forward switch.

18. The power converter, as recited in claim 17, wherein said synchronous rectifier control circuitry further comprises a delay controller for delaying pulse signals which are to be fed to said main switch for a predetermined period of time.

19. The power converter, as recited in claim 17, wherein said synchronous rectifier control circuitry further comprises a duty cycle turning circuit for turning a duty cycle to a predetermined period of time in such a manner that said main switch is adequately charged.

20. The power converter, as recited in claim 17, wherein said PMW controller is ML4800 PMW IC, having a CT terminal for generating sawtooth wave of a predetermined duty frequency, a FB-X1 terminal communicating with said synchronous rectifier continue conduction mode controller, first SS terminal for communicating with said SR-on-off controller, a CS terminal for communicating with a current signal from said main switch, a $V_{ref}$ terminal for maintaining a reference voltage, and a "Out" terminal for delivering signals to said main switch, said forward switch, and said freewheel switch.

21. The power converter, as recited in claim 17, wherein said SR-on-off controller comprises a regulating circuit for regulating a sequence of turning on and off said duty cycle.

22. The power converter, as recited in claim 17, wherein said SR driver comprises a strengthening circuit for strengthening said driver signal.

23. The power converter, as recited in claim 17, further comprising a converting circuit for converting said driver signals into pulse signals.

24. The power converter, as recited in claim 17, wherein said reverse current period is selected from the group of consisting of cutting off during no load operation, OVP test during ATE test operation, and transient load during dynamic test operation.

25. A method of controlling a synchronous rectifier in a power converter, comprising the steps of:
(a) sensing a characteristic of said power converter;
(b) developing a control signal for controlling said power converter based on said characteristic sensed; and
(c) modifying a duty cycle of said power converter as a function of said control signal thereby to turn off a freewheel switch of said synchronous rectifier before turning off a forward switch of said synchronous rectifier during a reverse current period.

* * * * *